United States Patent [19]

McDorman

[11] 4,269,048
[45] * May 26, 1981

[54] DOOR LOCKING SYSTEM

[76] Inventor: Robert L. McDorman, P.O. Box 473, La Porte, Tex. 77571

[*] Notice: The portion of the term of this patent subsequent to Jan. 2, 1996, has been disclaimed.

[21] Appl. No.: 971,024

[22] Filed: Dec. 19, 1978

Related U.S. Application Data

[63] Continuation-in-part of Ser. No. 825,823, Aug. 8, 1977, Pat. No. 4,132,093.

[51] Int. Cl.³ .............................................. E05B 65/48
[52] U.S. Cl. .......................................... 70/13; 70/34; 70/165; 70/231; 70/232
[58] Field of Search ......................... 70/2, 3, 4, 5, 6, 7, 70/8, 9, 10, 11, 12, 13, 23, 32, 33, 34, 102, 136, 165, DIG. 57, 229, 231, 232; 292/DIG. 32

[56] References Cited

U.S. PATENT DOCUMENTS 3,995,459  12/1976  Weeks .................................... 70/13
4,132,093  1/1979   McDorman ......................... 70/231

Primary Examiner—Robert L. Wolfe
Attorney, Agent, or Firm—Arnold, White & Durkee

[57] ABSTRACT

A door lock system for the rear doors of the trailer of a tractor-trailer rig is disclosed. The lock system includes a locking bar fixedly secured to one door and attachably secured to a second door. A pin projects from the second door so that it may pass through an opening in the locking bar. A pin cover locks over the pin for securing the bar to the second door. In a preferred embodiment the pin is formed identical to a conventional trailer king pin or coupling pin so that the pin cover may be used either to lock the trailer doors or as a theft prevention device covering the king pin to prevent unauthorized coupling of unattended trailers.

8 Claims, 6 Drawing Figures

U.S. Patent
May 26, 1981
4,269,048
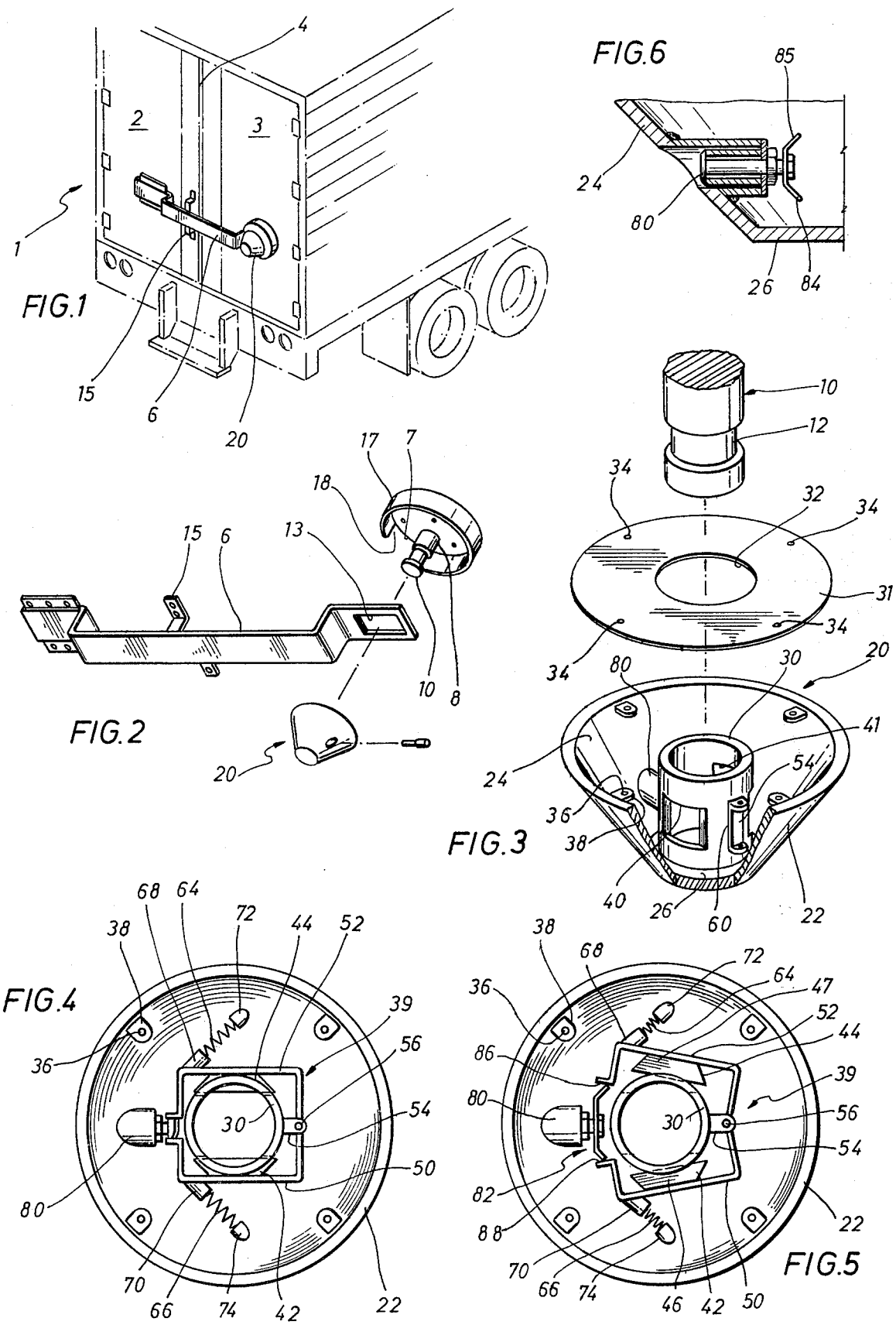

DOOR LOCKING SYSTEM

CROSS-REFERENCE TO RELATED APPLICATION

This application is a continuation-in-part of Ser. No. 825,823, filed Aug. 8, 1977, to be issued on Jan. 2, 1979, and now U.S. Pat. No. 4,132,093 the disclosure of which is incorporated herein by reference.

BACKGROUND OF THE INVENTION

1. Field of the Invention

The invention relates to locks for locking a pair of adjacent, pivotally mounted doors that close at a common line. More particularly, the invention relates to a locking system for locking the rear doors of the trailer of a tractor-trailer rig wherein a portion of the locking system may be utilized to cover the king pin or coupling pin of the trailer.

2. Description of the Prior Art

It is well known that the pivotally mounted rear doors of the trailer of a tractor-trailer rig must be securely locked in order to secure the cargo during transfer operations and to prevent cargo theft when the trailer is unattended. Conventional door locks have proven ineffective, especially against theft prevention. Thus, there is a need for a reliable, heavy-duty door lock particularly suited for use on the rear doors of trailers.

It is also well known that the trailers of tractor-trailer rigs are often parked in isolated spots or left unattended so that they are susceptible to being hijacked by unauthorized persons. It has been proposed to provide a rugged, heavy-duty cover to fit over the king pin or coupling pin of a trailer to prevent hijacking.

No known locking device is capable of serving as either a cover for the trailer king pin or, in an alternate mode, as a locking device in a trailer door lock.

SUMMARY OF THE INVENTION

In accordance with the present invention there is provided a locking system for locking a pair of adjacent, pivotally mounted doors that close along a common line, such as the rear doors of the trailer of a tractor-trailer rig. In a particular embodiment the locking system comprises:

(a) a locking bar having a first end secured to the first door and having a second end for extending beyond the common line and over the second door, said bar second end including an opening size to receive a lock pin;

(b) a lock pin for securement to the second door and for projecting from the second door to pass through said bar opening, said pin having a reduced diameter portion intermediate its ends; and (c) a pin cover for detachable locking engagement over said pin.

In a preferred embodiment the pin cover of the present invention includes a housing having a solid base and being made from a high chrome alloy steel. A cylindrical sleeve member is welded to the inside of the base of the housing and extends upwardly therein for substantially the height of the housing. The sleeve has an inside diameter slightly greater than the outside diameter of a conventional trailer king pin or coupling pin so that in one mode it may slidably receive a king pin or in another mode it may receive an identically sized door lock pin. The sleeve is provided with a pair of opposed recesses which receive a pair of spring-biased jaw elements which extend through the wall of the sleeve and engage the reduced diameter portion of the coupling pin to lock the pin in place. The jaw elements are secured to a pair of pivotally mounted U-shaped carriers which are normally spring-biased so as to urge the draw elements inwardly through the sleeve recesses. The carriers include camming surfaces which are adapted to engage a wing cam operable by means of a lock.

In one mode of operation, the pin cover may be slid onto the trailer king pin or coupling pin whereby the jaw elements automatically retract and then lock within the reduced diameter portion of the king pin. Once locked in place, the pin cover may be removed only by means of an authorized person having a key. When, as in accordance with a preferred embodiment, the pin cover housing is formed as a truncated cone, if an unauthorized tractor backs into engagement with a trailer carrying the pin cover, the king pin mating element of the tractor will simply slide along the outer surface of the housing cone thereby raising the housing and king pin and preventing any damage to the trailer.

In another mode of operation, the pin cover serves as the locking element that fits over the lock pin projecting from one of the trailer doors to secure the locking bar of the present invention in place.

A primary feature of the present invention is the provision of a lock assembly for locking a pair of adjacent, pivotally mounted doors that close along a common line, such as the rear doors of the trailer of a tractor-trailer rig. One aspect of this feature is that the locking system may include a locking bar secured to one door and having an opening for fitting over a post or lock pin projecting from the second door whereby the bar is held over the pin by means of a pin cover.

A further feature of the invention is that the pin cover may be used as an anti-theft device for covering the king pin or coupling pin of a trailer to prevent the unauthorized taking of the trailer.

Another feature of the invention is the provision of a security system for the trucking industry having the dual function of a trailer door lock and a king pin cover.

BRIEF DESCRIPTION OF THE DRAWINGS

FIG. 1 is a perspective view of the rear portion of a trailer of a tractor-trailer rig showing the door locking system of the present invention.

FIG. 2 is an exploded view of the components of the door locking system.

FIG. 3 is an exploded view showing the end portion of the lock pin and the housing, internal sleeve and base plate of the pin cover housing.

FIG. 4 is a plan view of a portion of the pin cover in a locked position.

FIG. 5 is a view similar to FIG. 4 showing the unlocked position.

FIG. 6 is a section through the pin cover showing the key-operated lock and associated wing cam.

DETAILED DESCRIPTION OF THE PREFERRED EMBODIMENT

Referring to the drawing and in particular to FIGS. 1 and 2, there is shown a trailer 1 having pivotally mounted rear doors 2 and 3 that are adapted to close together at a common line 4. In accordance with the present invention, doors 2, 3 are locked in a closed position by means of a locking bar 6 which may be secured to door 2 by bolts or other suitable fasteners and which is detachably secured to door 3 by means of the pin and pin cover assembly of the present invention.

The pin and pin cover assembly includes a cylindrical lock pin 10 which is secured to a base plate 7 by means of a weld 8 or other suitable securement means. The base plate 7 is secured to door 3, for example, by bolts. Lock pin 10 is adapted to extend through a suitably sized opening 13 in the locking bar and into locking communication with a pin cover 20.

It will be noted that in the illustrated embodiment the central portion of the locking bar does not lie flush against doors 2, 3, but rather includes a central U-shaped portion which is adapted to engage a bracket 15 secured to door 2. This structure facilitates locking operations. It will also be noted that a circular guard member 17 extends substantially around base plate 7 except for an opening 18 formed to receive the locking bar. The guard member serves as a means for preventing tampering with the internal elements of the pin cover 20 when the cover is locked in place.

The description will now turn to a detailed discussion of the pin cover 20. Cover 20 includes a truncated conical housing 22 which comprises a sloped wall portion 24 and a flat base portion 26. Housing 20 preferably is made from a material which will resist relatively high impacts, and in a preferred embodiment, the housing is made from a high chrome alloy steel.

A cylindrical sleeve 30 is welded to the inside of base 26 and extends substantially the entire height of device 20. Sleeve 30 has an inside diameter slightly larger than the outside diameter of pin 10 and is adapted to receive the pin therein after it passes through a plate 31. As shown in FIG. 3, plate 31 is a flat sheet member which includes a central opening 32 for passing pin 10 and four holes 34 which align with holes 36 in boss elements 38 for securement of the plate to the housing by means of fasteners (not shown).

The lock assembly 39 for locking pin 10 within sleeve 30 will now be described in detail. Sleeve 30 includes a pair of opposed horizontal slots 40, 41 which are adapted to receive a pair of jaw elements 42 and 44, respectively. Jaw elements 42, 44 include sloping cam surfaces 46, 47 the function of which will be explained in detail below. Elements 42, 44 are secured by welding or the like to a pair of jaw carriers 50, 52 which are pivotally mounted on a U-bracket 54 by means of a retainer pin 56. The rear face 60 of U-bracket 54 is secured by welding or the like to the exterior surface of sleeve 30 so that carriers 50, 52 substantially surround sleeve 30. Carriers 50, 52 are spring-biased inwardly by means of a pair of coil springs 64, 66. Springs 64, 66 are received within bosses 68, 70 on the carriers and within bosses 72, 74 on the inner surface of cone 22.

Springs 64, 66 normally urge jaw elements 42, 44 to the lcoked position illustrated in FIG. 4. With lock assembly 39 in the position shown in FIG. 4 the device 20 may be lifted into engagement with pin 10 whereby the pin slides within sleeve 30 until it engages cam surfaces 46, 47, thereby forcing the jaw elements outwardly against the bias of springs 64, 66. When pin 10 is fully inserted into sleeve 30 the jaw elements 42, 44 are urged into the reduced diameter portion 12 of pin 10 thereby locking the device 20 to the pin 10.

With reference to FIGS. 4, 5 and 6 the unlocking of device 20 will now be described. Lock assembly 39 includes a tubular key-operated lock 80 which is operable to rotate a wing cam 82 having wing elements 84, 85. Wings 84, 85 are adapted to engage a pair of cam surfaces 86, 88 which are, in turn, secured to pivotally mounted carriers 50, 52. Thus upon actuation of lock 80 and the turning of wing cam 82, cam surfaces 86, 88 are urged outwardly against the bias of springs 64, 66 to the position illustrated in FIG. 5 where jaw elements 42, 44 are fully withdrawn from recesses 40, 41. In this position the device 20 may be removed from pin 10.

In the preferred embodiment the housing, cylindrical sleeve and jaw elements are made from a high chrome alloy steel. In the alternative, these elements have been made from a conventional mild steel; however, any suitable material may be used. Although the carriers 50, 52 have been illustrated as together forming a rectangle, the carriers may be curved on a radius at the corners or otherwise formed so that they may be easily stamped. In the preferred embodiment the inside diameter of sleeve 30 has been found to be optimized at $2\frac{7}{8}$ inches with slots having a height of approximately $1\frac{1}{2}$ inches.

It will be appreciated that in the preferred embodiment lock pin 10 has been formed substantially identical in size and shape to a conventional trailer king pin or coupling pin. Therefore, as explained above, the pin cover 20 serves a dual role in that it may serve either as the pin cover member for locking the locking bar in place or as a theft prevention device to cover the trailer king pin to prevent unauthorized coupling of unattended trailers.

While the present invention has been described in connection with specific embodiments, it will be appreciated that numerous modifications may be made without departing from the spirit or scope of the present invention. For example, while the housing of the pin cover has been described as preferably being in the shape of a truncated cone, other housing shapes such as cylindrical may be utilized. This and other variations fall within the scope of the present invention.

What is claimed is:

1. A lock assembly comprising:
a lock pin having a reduced portion intermediate its ends;
a pin cover for locking engagement over said pin comprising:
a housing having a solid base;
a sleeve secured to the inside surface of said base and extending therefrom for substantially the height of said housing, said sleeve having inside dimensions larger than the outside dimensions of said pin to provide a sliding fit between the sleeve and the pin, said sleeve having a pair of opposed slots intermediate its length;
a pair of jaw elements adapted to fit within said slots and providing opposed locking surfaces on their lower faces when fully inserted into said slots, said jaw elements having upper cam surfaces for engaging the pin as it is inserted into said sleeve for camming the jaw elements outwardly during insertion;
means for biasing said jaw elements into said slots comprising pivotally mounted jaw carriers substantially surrounding said sleeve and secured to said jaw elements and resilient means for urging said jaw carriers inwardly;
a lock recessed in the sidewall of said housing and having rotatable cam elements operable to engage mating surfaces on said jaw carriers to urge said jaw carriers outwardly against the bias of said resilient means; and a cover plate detachably secured to the larger end of said housing and having a central opening for passing the pin.

2. An assembly as claimed in claim 1 wherein said jaw carriers are pivotally mounted by a U-bracket secured to the external surface of said sleeve.

3. A security device as claimed in claim 1 wherein said rotatable cam elements comprise a wing cam.

4. An assembly as claimed in claim 1 wherein said pin is secured to a plate member, said plate member being at least partially surrounded by a guard.

5. An assembly as claimed in claim 1 including a locking bar having an opening for receiving said lock pin.

6. A locking system for locking a pair of adjacent, pivotally mounted doors that close together at a common line, comprising:
- a locking bar having a first end secured to the first door and having a second end for extending beyond the common line and over the second door, said bar second end including an opening sized to receive a lock pin;
- a lock pin for securement to the second door and for projecting from the second door to pass through said bar opening, said pin having a reduced diameter portion intermediate its ends;
- said pin being cylindrical and having dimensions substantially the same as a conventional tractor-trailer coupling pin; and
- said pin being secured to a base plate and surrounded by a guard including an opening for receiving the locking bar; and
- a pin cover for detachable locking engagement over said pin.

7. A locking system as claimed in claim 6 wherein said pin cover includes a housing in the form of a truncated cone.

8. A locking system for locking a pair of adjacent, pivotally mounted doors that close together at a common line, comprising:
- a locking bar having a first end secured to the first door and having a second end for extending beyond the common line and over the second door, said bar second end including an opening sized to receive a lock pin;
- a lock pin for securement to the second door and for projecting from the second door to pass through said bar opening, said pin having a reduced diameter portion intermediate its ends;
- said pin being secured to a base plate and surrounded by a guard including an opening for receiving the locking bar; and
- a pin cover for detachable locking engagement over said pin.

* * * * *